United States Patent
Iwasaki

(10) Patent No.: US 12,316,942 B2
(45) Date of Patent: May 27, 2025

(54) LENS MODULE, CAMERA AND PORTABLE ELECTRONIC DEVICE

(71) Applicant: AAC Optics (Nanning) Co., Ltd., Guangxi (CN)

(72) Inventor: Takashi Iwasaki, Osaka (JP)

(73) Assignee: AAC Optics (Nanning) Co., Ltd., Nanning (CN)

( * ) Notice: Subject to any disclaimer, the term of this patent is extended or adjusted under 35 U.S.C. 154(b) by 141 days.

(21) Appl. No.: 18/327,900

(22) Filed: Jun. 2, 2023

(65) Prior Publication Data

US 2023/0403454 A1 Dec. 14, 2023

(51) Int. Cl.
*H04N 23/55* (2023.01)
*H04N 23/68* (2023.01)

(52) U.S. Cl.
CPC ............ *H04N 23/55* (2023.01); *H04N 23/687* (2023.01)

(58) Field of Classification Search
CPC .......... G02B 7/08; H04N 23/57; H04N 23/55; H04N 23/687; H04N 23/54
USPC ................................................... 348/207.99
See application file for complete search history.

(56) References Cited

U.S. PATENT DOCUMENTS

| | | | |
|---|---|---|---|
| 7,391,466 B2* | 6/2008 | Machida | H04N 23/57 348/374 |
| 8,873,945 B2* | 10/2014 | Inagaki | G03B 17/02 348/535 |
| 9,602,726 B2* | 3/2017 | Eromaki | G02B 27/646 |
| 9,606,352 B2* | 3/2017 | Kashima | H04N 23/52 |
| 10,663,838 B2* | 5/2020 | Yang | G03B 17/02 |
| 2005/0248684 A1* | 11/2005 | Machida | G03B 17/00 396/533 |
| 2014/0212126 A1* | 7/2014 | Inagaki | G03B 17/02 396/535 |
| 2014/0340537 A1* | 11/2014 | Eromaki | G03B 5/06 348/208.8 |
| 2019/0227410 A1* | 7/2019 | Yang | H04N 23/51 |

FOREIGN PATENT DOCUMENTS

CN 105022204 A 11/2015
CN 111323885 A 6/2020

* cited by examiner

*Primary Examiner* — Pritham D Prabhakher
(74) *Attorney, Agent, or Firm* — Wiersch Law Group

(57) ABSTRACT

The present discloses a lens module, a camera and a portable electronic device. The lens module comprises a fixed component, a moving part and a dust absorption gel. The moving part comprises a lens holder for fixing a lens and driving the lens to move in the direction of an optical axis to realize focusing, and/or a movable frame for fixing an image sensing unit and driving the image sensing unit to move to realize image stabilization. One of the fixed component and the moving part is provided with an accommodating cavity with an opening, and the other is provided with a protrusion, which is inserted into the accommodating cavity from the opening in a first direction and is able to move in the accommodating cavity. The impact of foreign matter on the imaging quality caused by collision and friction between components of the lens module can be effectively avoided.

13 Claims, 11 Drawing Sheets

LENS MODULE, CAMERA AND PORTABLE ELECTRONIC DEVICE

TECHNICAL FIELD

The embodiments of the present invention relate to the technical field of optical imaging, in particular to a lens module, a camera and a portable electronic device.

BACKGROUND

With the continuous development of mobile communication technology, the demand for the performance of a lens module in a mobile communication device becomes increasingly higher. In order to improve the quality of pictures taken by the lens module, the lens module usually has an automatic focus (AF) function and an optical image stabilization (OIS) function. When taking pictures, AF can be realized by changing the position of a lens, and OIS can be realized by changing the position of a photosensitive element.

However, in some cases, when the lens module moves for focusing or image stabilization or is subjected to an external impact, foreign matter (such as dust) tends to be generated between components of the lens module due to collision and friction. The foreign matter will affect the imaging quality of the lens module after entering a photosensitive surface of the photosensitive element. Therefore, how to effectively avoid the impact of foreign matter on the imaging quality caused by collision and friction between components of the lens module is an urgent problem to be solved.

SUMMARY

The embodiments of the present invention provide a lens module, a camera and a portable electronic device, which can effectively avoid the impact of foreign matter on the imaging quality caused by collision and friction between components of the lens module.

In order to solve the above technical problems, the embodiments of the present invention provide a lens module, which comprises a fixed component, a moving part and a dust absorption gel. The moving part is movably arranged on the fixed component, and the moving part comprises a lens holder for fixing a lens and driving the lens to move in the direction of an optical axis to realize focusing, and/or a movable frame for fixing an image sensing unit and driving the image sensing unit to move to realize image stabilization. The lens module further comprises a focusing drive mechanism for driving the lens holder to move relative to the fixed component, and/or an image stabilization drive mechanism for driving the movable frame to move relative to the fixed component. One of the fixed component and the moving part is provided with an accommodating cavity with an opening, the other is provided with a protrusion, which is inserted into the accommodating cavity from the opening in a first direction and is able to move in the accommodating cavity, the accommodating cavity has a first surface spaced apart from the protrusion in the first direction and a first side face extending from a periphery of the first surface in the first direction, and the protrusion has a second surface spaced apart from the first surface and a second side face extending from the second surface in the first direction. The dust absorption gel is arranged on the first surface and seals a gap between the first surface and the second surface, or is arranged on the second side face and seals a gap between the first side face and the second side face.

The embodiments of the present invention also provide a camera, which comprises the lens module mentioned above.

The embodiments of the present invention also provide a portable electronic device, which comprises the camera mentioned above.

Further, the first direction is parallel to the optical axis, the moving part is a movable frame, the fixed component comprises an automatic focus base and an image stabilization mechanism base fixed to the automatic focus base which are arranged in sequence in the direction of the optical axis, and the movable frame is movably arranged on the image stabilization mechanism base; and the accommodating cavity is arranged on the movable frame and has the opening facing the automatic focus base, and the protrusion is arranged on the automatic focus base.

Further, the dust absorption gel is arranged on the first surface and seals the gap between the first surface and the second surface.

Further, the accommodating cavity comprises a limiting part extending from the first surface in a direction towards the automatic focus base and spaced apart from the first side face, the protrusion is of an annular structure surrounding the limiting part, and the dust absorption gel is of an annular structure surrounding the limiting part.

Further, the movable frame is quadrangular, and four accommodating cavities are arranged on four sides of the movable frame respectively.

Further, the dust absorption gel is arranged on the second side face and seals the gap between the first side face and the second side face.

Further, the image stabilization drive mechanism comprises a coil for the image stabilization mechanism arranged on the movable frame and a magnet for the image stabilization mechanism arranged on the image stabilization mechanism base.

Further, the first direction is parallel to the optical axis, the moving part is a movable frame, the fixed component comprises an image stabilization mechanism base, and the movable frame is movably arranged on the image stabilization mechanism base; and the movable frame is provided with the accommodating cavity, and the image stabilization mechanism base is provided with the protrusion.

Further, the first direction is perpendicular to the optical axis, the moving part is a movable frame, the fixed component comprises an image stabilization mechanism base, and the movable frame is movably arranged on the image stabilization mechanism base; and the image stabilization mechanism base is provided with the accommodating cavity, and the movable frame is provided with the protrusion.

Further, the first direction is perpendicular to the optical axis, the moving part is a lens holder, the fixed component has an inner wall facing the optical axis, the accommodating cavity is arranged on the inner wall, and the protrusion is arranged on the lens holder.

Further, the first direction is parallel to the optical axis, the moving part is a lens holder, and the fixed component comprises a magnet holding frame for automatic focus and an automatic focus base fixed to the magnet holding frame for automatic focus which are arranged in sequence in the direction of the optical axis; and the accommodating cavity is arranged on the lens holder, and the protrusion is arranged on the automatic focus base and the magnet holding frame for automatic focus.

Further, an end, close to the first surface, of the protrusion is provided with an anti-falling part extending in a direction towards the first side face.

According to the lens module, the camera and the portable electronic device provided by the embodiments of the present invention, a stop structure is formed between the moving part and the fixed component through the protrusion and the accommodating cavity, and the moving part will approach the fixed component to make the protrusion move in the accommodating cavity during movement for focusing, zooming and image stabilization or movement under an external impact. By arranging the dust absorption gel on the first surface of the accommodating cavity and sealing the gap between the first surface of the accommodating cavity and the second surface of the protrusion, or arranging the dust absorption gel on the second side face of the protrusion and sealing the gap between the first side face of the accommodating cavity and the second side face of the protrusion, foreign matter can adhere to the gel, instead of adhering to a photosensitive surface of an image sensing unit, thus effectively avoiding the impact of foreign matter on the imaging quality caused by collision and friction between components of the lens module.

LIST OF REFERENCE NUMERALS

Figure 1:
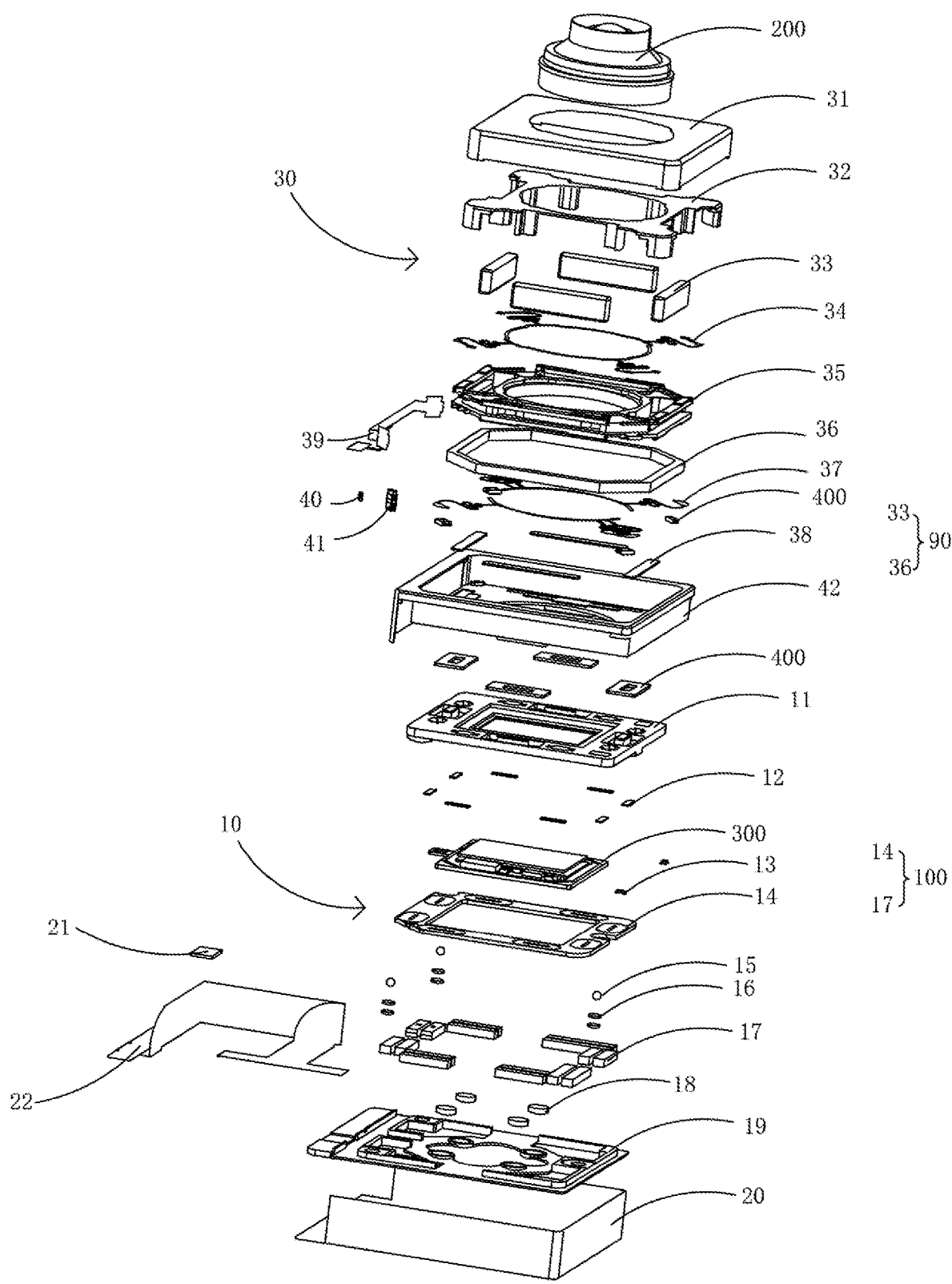
FIG. 1 is an explosive view of a lens module provided by some embodiments of the present invention.
Figure 2:
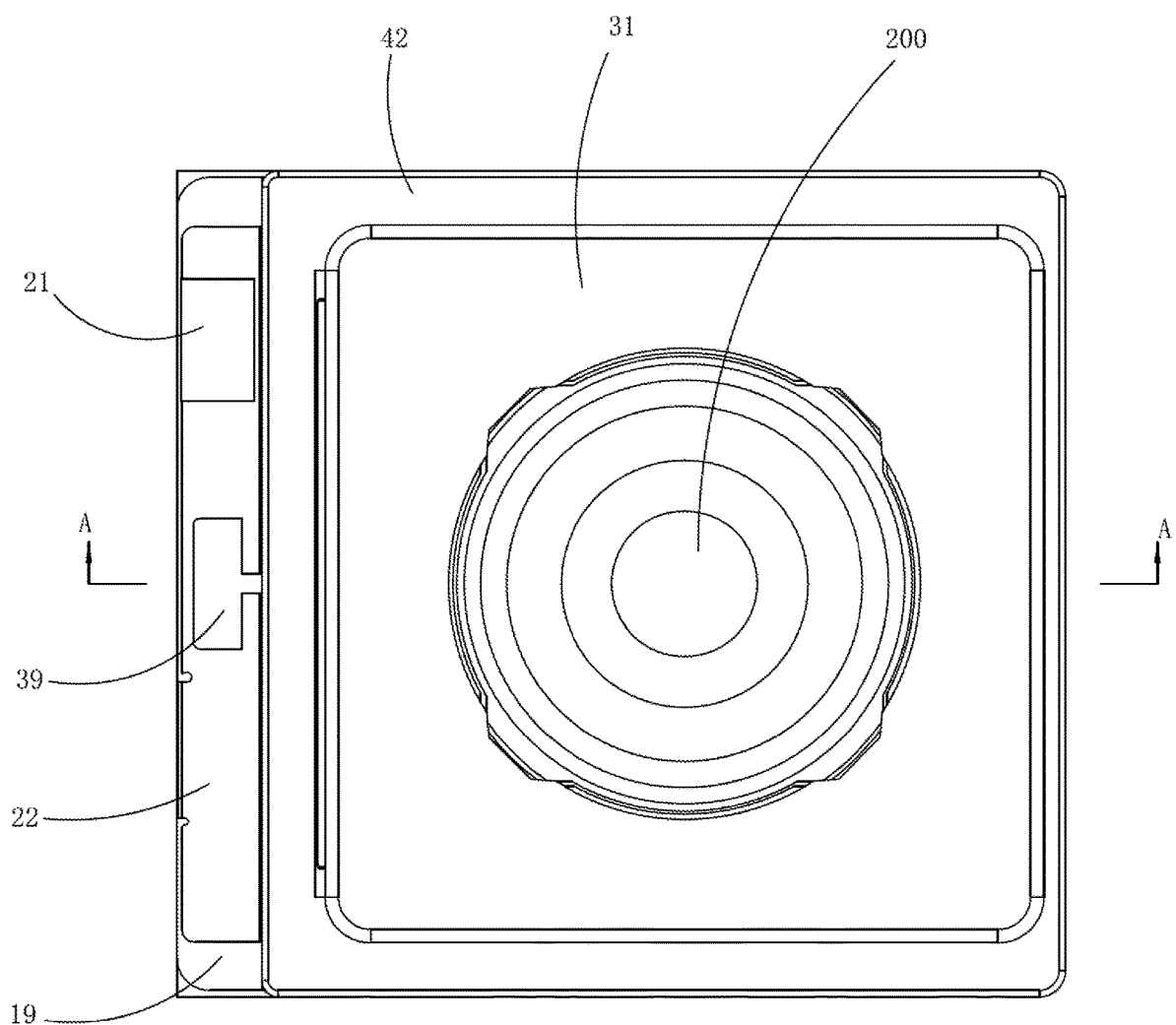
FIG. 2 is a top view of a lens module provided by some embodiments of the present invention.

10, image stabilization mechanism; 11, movable frame; 12, magnetic yoke for image stabilization mechanism; 13, hall element for image stabilization mechanism; 14, coil for image stabilization mechanism; 15, supporting part; 16, support plate; 17, magnet for image stabilization mechanism; 18, shock-absorbing gel; 19, image stabilization mechanism base; 20, housing for image stabilization mechanism; 21, drive IC; 22, FPC for image stabilization mechanism; 30, automatic focus mechanism; 31, housing for automatic focus; 32, magnet holding frame for automatic focus; 33, drive magnet for automatic focus; 34, upper leaf spring for automatic focus; 35, lens holder; 36, drive coil for automatic focus; 37, lower leaf spring for automatic focus; 38, magnetic yoke for automatic focus; 39, FPC for automatic focus; 40, hall element for automatic focus; 41, position detection magnet for automatic focus; 42, automatic focus base; 50, fixed component; 51, inner wall; 60, moving part; 70, accommodating cavity; 71, opening; 72, first surface; 73, first side face; 74, limiting part; 80, protrusion; 81, second surface; 82, second side face; 83, anti-falling part; 90, focusing drive mechanism; 100, image stabilization drive mechanism; 200, lens; 300, image sensing unit; 400, dust absorption gel; 500, focus adjustment mechanism; 600, zoom lens mechanism; 1000, camera; 2000, portable electronic device.

DETAILED DESCRIPTION OF EMBODIMENTS

In order to make the purpose, technical scheme and advantages of the embodiments of the present invention clearer, the embodiments of the present invention will be described in detail with the attached drawings. However, it can be understood by those of ordinary skill in the art that in various embodiments of the present invention, many technical details are set forth for readers to better understand the present invention. However, even without these technical details and various changes and modifications based on the following embodiments, the technical scheme claimed by the present invention can still be realized.

A high-performance lens module generally has an automatic focus function and an optical image stabilization function. To realize automatic focus, a lens should be able to move in the direction of an optical axis in an accommodating space surrounded by a base and a housing. Optical image stabilization is to compensate a vibrating light path through moving parts, so as to ensure the clarity of photos taken. In the actual situation, a part for fixing a photosensitive element in the lens module can be movably installed on the base, and optical image stabilization can be realized by controlling the part to move in a direction perpendicular to the optical axis of the lens or rotate around the optical axis. Here, moving in the direction perpendicular to the optical axis of the lens to achieve image stabilization is called shift image stabilization, and rotating around the optical axis to achieve image stabilization is called tilt image stabilization. Further, the lens module can also have a zooming function. Zooming, as the name implies, refers to changing the focal length of the lens. By zooming, the shooting range of the lens can be adjusted. Zooming and automatic focus can be achieved by controlling the lens to move in the direction of the optical axis.

However, during movement for focusing, zooming and image stabilization or movement under an external force (such as falling or impact), some parts of the lens module will approach other parts that play a fixing role. When collision and friction occur between these moving parts and the parts that play a fixing role at a stop structure, foreign matter such as dust will be generated. After entering a photosensitive surface of a photosensitive element, the foreign matter will adhere to the photosensitive surface, which will eventually affect the imaging quality of the lens module.

Therefore, how to effectively avoid the impact of foreign matter on the imaging quality caused by collision and friction between components of the lens module is an important problem to be solved.

In some cases, in order to reduce the influence of the foreign matter on the imaging quality of the lens module, a concave foreign matter containing structure is usually arranged in the lens module. The generated foreign matter will be contained in the concave structure. In this way, foreign matter can be prevented from entering an optical effective area and thus will not affect the imaging quality of the photosensitive element to a certain extent; however, some of the foreign matter still moves to other areas in the lens module and finally adheres to the photosensitive surface of the photosensitive element to affect the imaging quality.

In order to effectively avoid the impact of foreign matter on the imaging quality caused by collision and friction between components of the lens module, some embodiments of the present invention provide a lens module. A dust absorption gel is arranged at a stop structure between a movable part and a fixed part of the lens module for sealing, and the dust absorption gel not only can be filled in a joint gap at the stop structure, but also can be arranged in an opening at the stop structure. After adding the dust absorption gel, the movable part can be prevented from directly colliding with a supporting part when moving, and foreign matter caused by collision and friction can adhere to the dust absorption gel, so as to effectively avoid the impact of foreign matter on the imaging quality caused by collision and friction between components of the lens module.

Next, the structure of the lens module provided by some embodiments of the present invention will be described with reference to the drawings.

Figure 3:
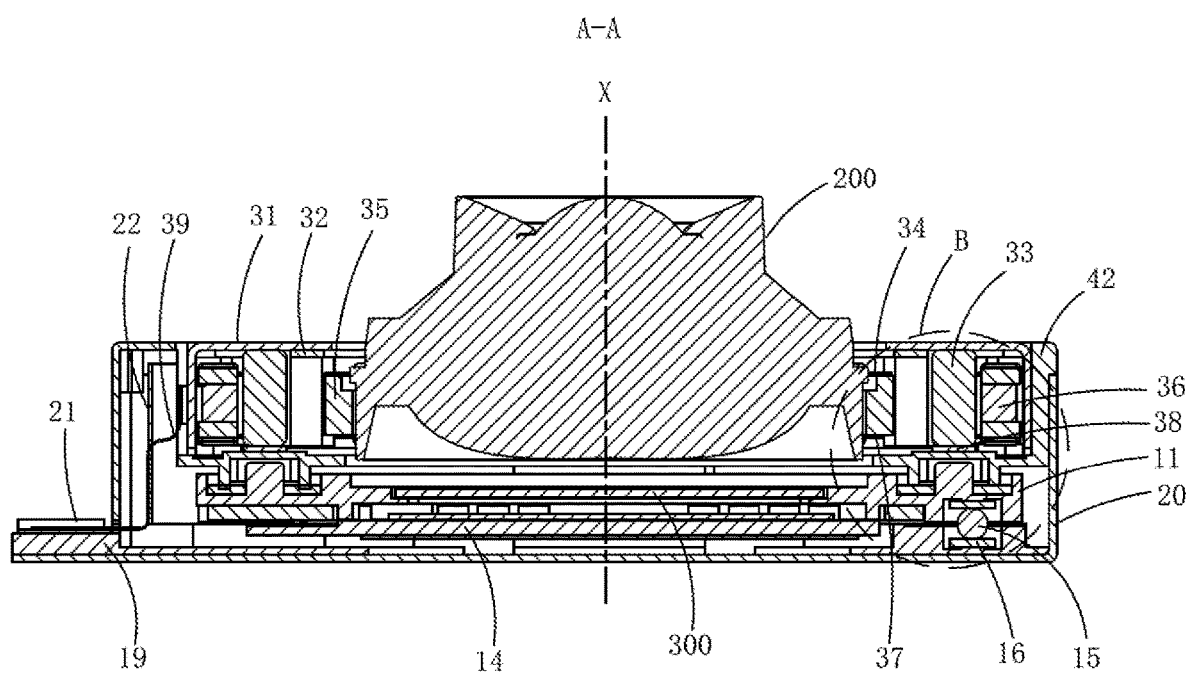
FIG. 3 is a sectional view taken along A-A in FIG. 2.
Figure 4:
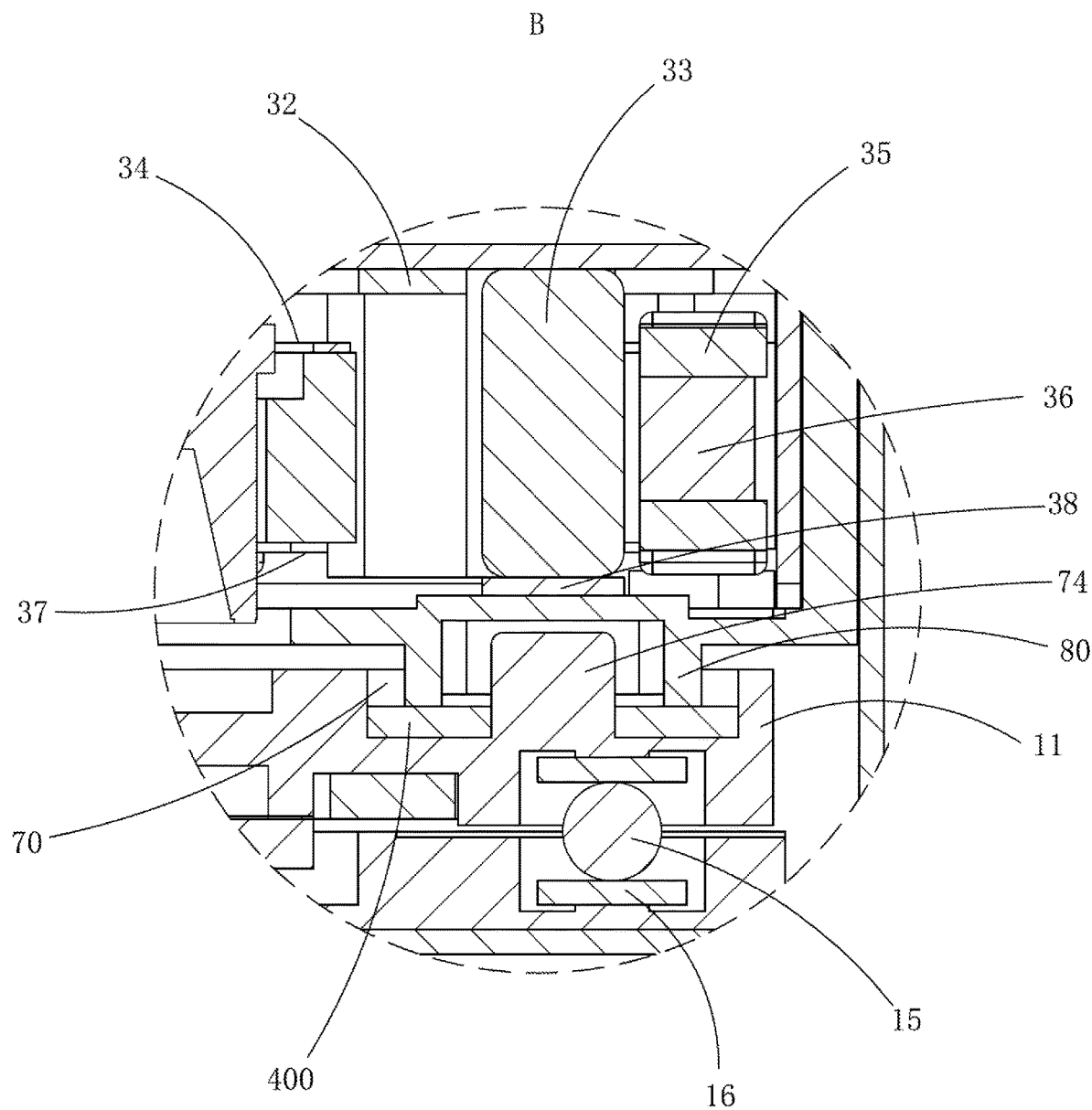
FIG. 4 is an enlarged view of part B in FIG. 3.
Figure 5:
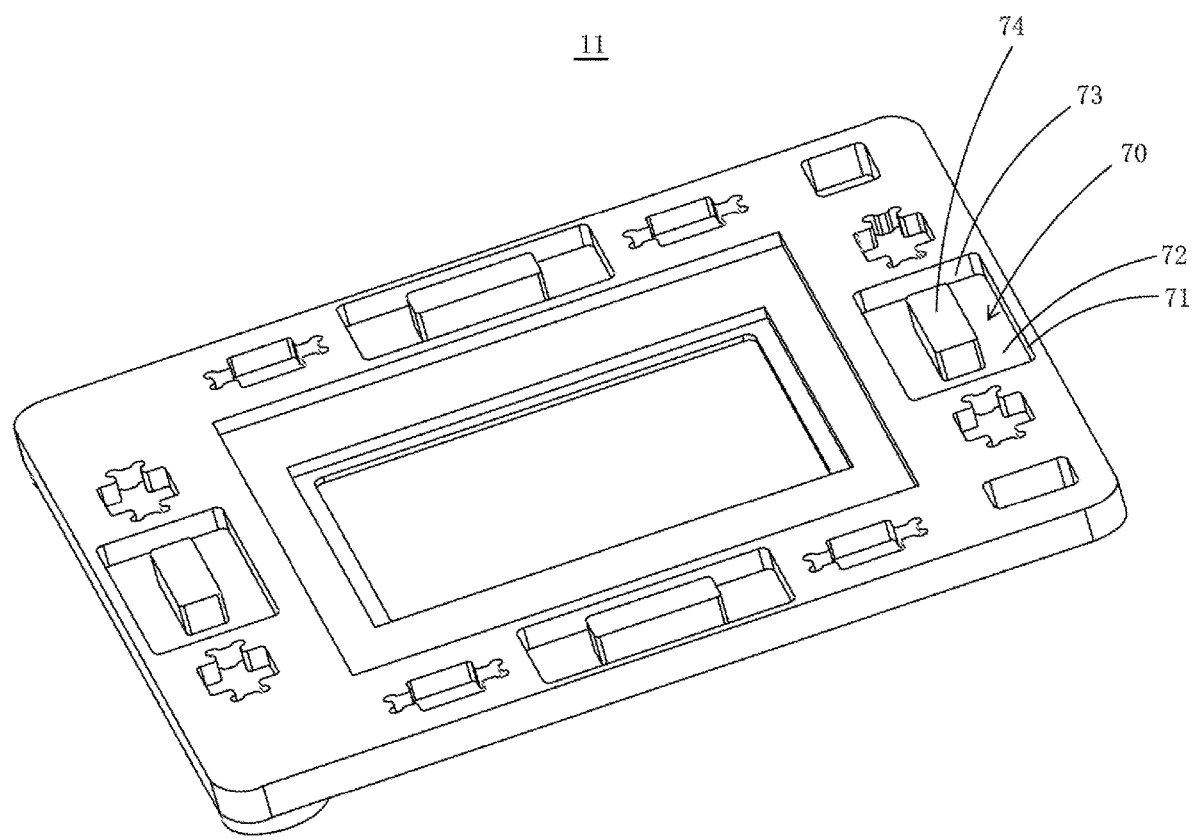
FIG. 5 is a perspective view of a movable frame in a lens module provided by some embodiments of the present invention.
Figure 6:
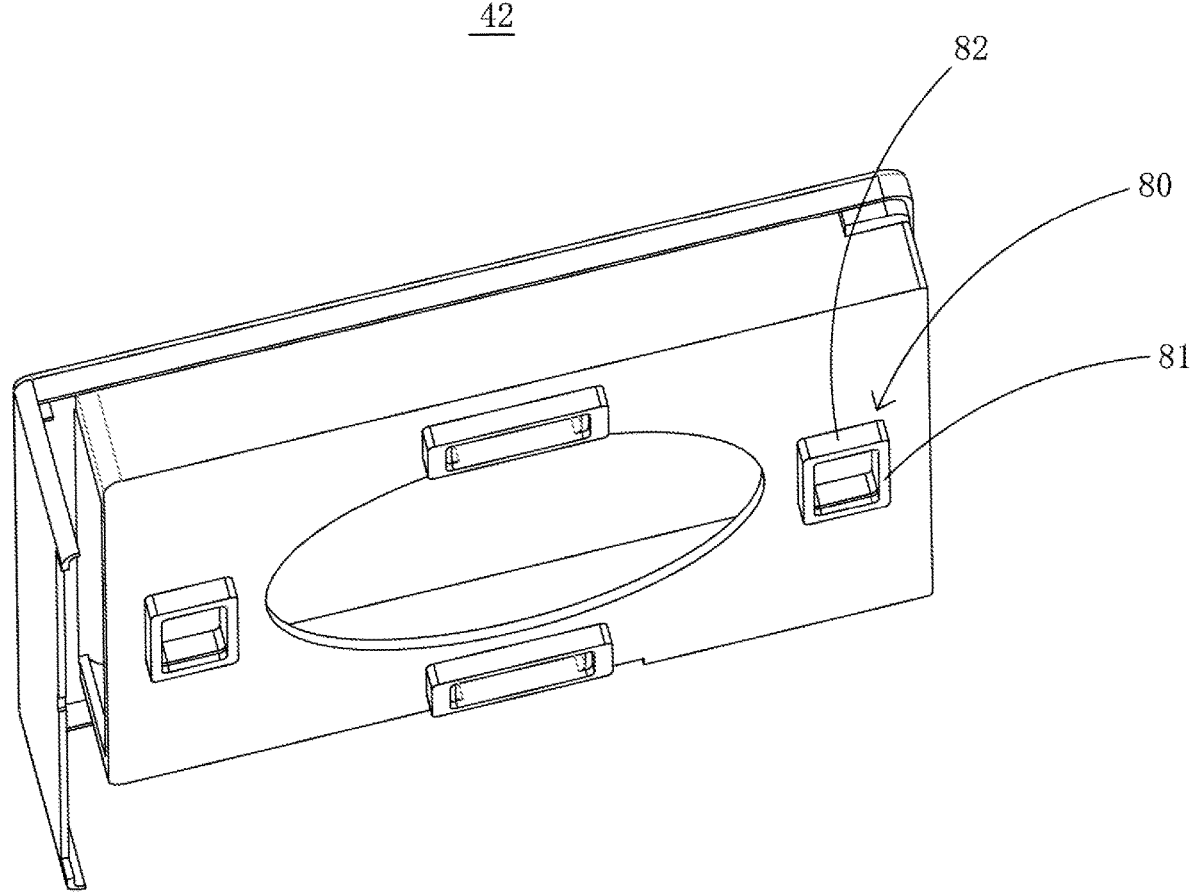
FIG. 6 is a perspective view of an automatic focus base in a lens module provided by some embodiments of the present invention.

As shown in FIGS. 1-13, the lens module provided by some embodiments of the present invention comprises a fixed component 50, a moving part 60 and a dust absorption gel 400. The moving part 60 is movably arranged on the fixed component 50, and the moving part 60 comprises a lens holder 35 for fixing a lens 200 and driving the lens 200 to move in the direction of an optical axis (as shown by the center line X in FIG. 3) to realize focusing, and/or a movable frame 11 for fixing an image sensing unit 300 and driving the image sensing unit 300 to move to realize image stabilization. The lens module further comprises a focusing drive mechanism 90 for driving the lens holder 35 to move relative to the fixed component 50, and/or an image stabilization drive mechanism 100 for driving the movable frame 11 to move relative to the fixed component 50. One of the fixed component 50 and the moving part 60 is provided with an accommodating cavity 70 with an opening 71 (as shown in FIGS. 4 and 5), the other is provided with a protrusion 80, which is inserted into the accommodating cavity 70 from the opening 71 in a first direction and is able to move in the accommodating cavity 70 (as shown in FIGS. 4 and 6), the accommodating cavity 70 has a first surface 72 spaced apart from the protrusion 80 in the first direction and a first side face 73 extending from a periphery of the first surface 72 in the first direction, and the protrusion 80 has a second surface 81 spaced apart from the first surface 72 and a second side face 82 extending from the second surface 81 in the first direction. The dust absorption gel 400 is arranged on the first surface 72 of the accommodating cavity 70 and seals a gap between the first surface 72 of the accommodating cavity 70 and the second surface 81 of the protrusion 80, or is arranged on the second side face 82 of the protrusion 80 and seals a gap between the first side face 73 of the accommodating cavity 70 and the second side face 82 of the protrusion 80.

The fixed component 50 plays a role in supporting the lens module. The fixed component 50 may comprise an automatic focus base 42 for forming an accommodating space for the lens 200, a housing for automatic focus 31, and a frame for supporting the lens 200 and a photosensitive element.

The moving part 60 is a part of the lens module that will collide with the fixed component 50 during movement. The moving part 60 may comprise the lens holder 35 for fixing the lens 200 and/or the movable frame 11 for fixing the image sensing unit 300 (i.e., the photosensitive element), one of the moving part 60 and the fixed component 50 is provided with the accommodating cavity 70, and the other is provided with the protrusion 80. The protrusion 80 may cooperate with the accommodating cavity 70 to play a stopping role, that is, the protrusion 80 and the accommodating cavity 70 can form a stop structure.

The dust absorption gel 400 is a part arranged in the lens module to allow foreign matter to adhere thereto. The dust absorption gel 400 also has a shock-absorbing effect, and can play a buffering role when the focusing drive mechanism 90 and the image stabilization drive mechanism 100 are suddenly electrified to generate fluctuations.

According to the lens module provided by some embodiments of the present invention, the stop structure is formed between the moving part 60 and the fixed component 50 through the protrusion 80 and the accommodating cavity 70, and the moving part 60 will approach the fixed component 50 to make the protrusion 80 move in the accommodating cavity 70 during movement for focusing, zooming and image stabilization or movement under an external impact. By arranging the dust absorption gel 400 on the first surface 72 of the accommodating cavity 70 and sealing the gap between the first surface 72 of the accommodating cavity 70 and the second surface 81 of the protrusion 80, or arranging the dust absorption gel 400 on the second side face 82 of the protrusion 80 and sealing the gap between the first side face 73 of the accommodating cavity 70 and the second side face 82 of the protrusion 80, foreign matter can adhere to the gel, instead of adhering to a photosensitive surface of the image sensing unit 300, thus effectively avoiding the impact of foreign matter on the imaging quality caused by collision and friction between components of the lens module.

Due to the existence of the accommodating cavity 70, the dust absorption gel 400 with low viscosity will not flow out before hardening, and can maintain a shape matching the accommodating cavity 70, so the processing during manufacturing is easy, and the selection range of the dust absorption gel 400 can be expanded. Meanwhile, the dust absorption gel 400 can be replaced by grease or adhesives.

Here, the dust absorption gel 400 can be arranged at different positions according to the arrangement of the moving part 60. For example, when the moving part 60 is the lens holder 35, the dust absorption gel 400 can be arranged at the stop structure between the lens holder 35 and the fixed component 50; when the moving part 60 is the movable frame 11, the dust absorption gel 400 can be arranged at the stop structure between the movable frame 11 and the fixed component 50; and when the moving part 60 comprises both the lens holder 35 and the movable frame 11, the dust absorption gel 400 can be arranged at the stop structure between the lens holder 35 and the fixed component 50 and at the stop structure between the movable frame 11 and the fixed component 50.

In some embodiments of the present invention, the first direction is parallel to the optical axis, the moving part 60 may be a movable frame 11, the fixed component 50 may comprise an automatic focus base 42 and an image stabilization mechanism base 19 fixed to the automatic focus base 42 which are arranged in sequence in the direction of the optical axis, and the movable frame 11 is movably arranged on the image stabilization mechanism base 19; and the accommodating cavity 70 is arranged on the movable frame 11 and has the opening 71 facing the automatic focus base 42, and the protrusion 80 is arranged on the automatic focus base 42.

When the movable frame 11 drives the image sensing unit 300 to move in a plane perpendicular to the optical axis or rotate around the optical axis to realize image stabilization, the protrusion 80 on the automatic focus base 42 will move in the accommodating cavity 70 on the movable frame 11. When the second side face 82 of the projection 80 on the automatic focus base 42 contacts the first side face 73 of the accommodating cavity 70 on the movable frame 11, the movable frame 11 will stop moving.

After the dust absorption gel 400 is applied to the first surface 72 of the accommodating cavity 70 of the movable frame 11 and solidified, the focusing drive mechanism 90 and the image stabilization drive mechanism 100 are assembled by making the second surface 81 of the protrusion 80 of the automatic focus base 42 contact the dust absorption gel 400. That is, the dust absorption gel 400 is arranged on the first surface 72 of the accommodating cavity 70 and seals the gap between the first surface 72 of the accommodating cavity 70 and the second surface 81 of the protrusion 80, thereby sealing the gap between the first surface 72 of the accommodating cavity 70 on the movable frame 11 and the second surface 81 of the protrusion 80 of the automatic focus base 42, so that foreign matter can adhere to the dust absorption gel 400.

Further, the accommodating cavity 70 may comprise a limiting part 74 extending from the first surface 72 in a direction towards the automatic focus base 42 and spaced apart from the first side face 73, the protrusion 80 is of an annular structure surrounding the limiting part 74, and the dust absorption gel 400 is of an annular structure surrounding the limiting part 74.

The limiting part 74 is a part arranged in the accommodating cavity 70 and protruding from the first surface 72 of the accommodating cavity 70, and the limiting part 74 is surrounded by the protrusion 80 on the automatic focus base 42. The movement range of the movable frame 11 during movement for image stabilization can be limited by the blocking action of the limiting part 74.

In some embodiments of the present invention, the movable frame 11 is quadrangular, and four accommodating cavities 70 are arranged on four sides of the movable frame 11 respectively.

As shown in FIG. 5, the outer contour of the movable frame 11 can be rectangular, the four accommodating cavities 70 are arranged corresponding to the four sides of the rectangle respectively, and each accommodating cavity 70 is located at the middle position of the corresponding side of the rectangle. By arranging a plurality of accommodating cavities 70 and uniformly distributing the accommodating cavities 70, the positions where the protrusion 80 is subjected to a blocking force can be uniformly distributed, thus ensuring the stability of the movable frame 11 when stopping.

In some embodiments of the present invention, the dust absorption gel 400 may also be arranged on the second side face 82 of the protrusion 80 on the automatic focus base 42 and seal the gap between the first side face 73 of the accommodating cavity 70 on the movable frame 11 and the second side face 82 of the protrusion 80 on the automatic focus base 42.

The image stabilization drive mechanism 100 comprises a coil for the image stabilization mechanism 14 arranged on the movable frame 11 and a magnet for the image stabilization mechanism 17 arranged on the image stabilization mechanism base 19.

The image sensing unit 300 is fixed to the movable frame 11 together with the coil for the image stabilization mechanism 14 and a magnetic yoke for the image stabilization mechanism 12. The movable frame 11 is an integrated frame, which integrates the protective components for protecting the image sensing unit 300 and a frame of an optical filter, and is used for protecting the image sensing unit 300 and the infrared cut-off optical filter for blocking harmful wavelengths. The design of the movable frame 11 can reduce the use of components and improve the verticality of the image sensing unit 300 relative to the optical axis, thereby reducing the inclination of the image sensing unit 300 relative to the optical axis and the variation of the flatness of the image sensing unit 300, and improving the overall rigidity of the image sensing unit 300 and the protection against drop impact, which not only contributes to miniaturization and height reduction, but also improves the assembly convenience and the performance of the whole image stabilization mechanism 10.

Here, at least two Hall elements for the image stabilization mechanism 13 are mounted on the coil for the image stabilization mechanism 14, and by detecting the magnetic flux of the fixed magnet for the image stabilization mechanism 17, accurate position detection and image stabilization control can be conducted on the movable frame 11. The Hall element for the image stabilization mechanism 13, the coil for the image stabilization mechanism 14, a signal line of the image sensing unit 300, a power supply, etc. can be placed outside the movable frame 11 through an FPC22 (Flexible Printed Circuit) for the image stabilization mechanism, so that these components will not interfere with the movement of the movable frame 11. Further, the FPC22 for the image stabilization mechanism has a drive IC21 (Integrated Circuit), which can be used for closed-loop control of the automatic focus mechanism 30.

By electrifying the coil for the image stabilization mechanism 14 mounted on the movable frame 11 to generate an electromagnetic field, an electromagnetic force can be efficiently generated relative to the magnet for the image stabilization mechanism 17, so that the coil for the image stabilization mechanism 14 can move freely in the plane perpendicular to the optical axis and drive the movable frame 11, thereby realizing the image stabilization function. The coil for the image stabilization mechanism 14 may be of a structure with a plurality of single coil windings, or may be a conductive pattern formed on the FPC22 for the image stabilization mechanism according to the shape of the coil for the image stabilization mechanism 14. By making the directions of currents flowing through the coils for the image stabilization mechanism 14 on two sides opposite, the movable frame 11 can be driven in the rotation direction around the optical axis, which can also be applied to an anti-rotation offset mechanism.

Further, support plates 16 are provided on both the movable frame 11 and the image stabilization mechanism base 19, and supporting parts 15 (such as balls) are provided between the support plates 16 of the movable frame 11 and the image stabilization mechanism base 19. With the supporting parts 15, the movable frame 11 can rotate smoothly with respect to the image stabilization mechanism base 19. The image stabilization mechanism base 19 may be arranged on a housing for the image stabilization mechanism 20.

The magnetic yoke for the image stabilization mechanism 12 is mounted on the movable frame 11 and can be attracted to the center by the relatively fixed magnet for the image stabilization mechanism 17, so that the movable frame 11 always has a magnetic spring effect, that is, being attracted to the center of the optical axis by the magnetic yoke for the image stabilization mechanism 12 and the magnet for the image stabilization mechanism 17. Therefore, a gap can be eliminated efficiently, and the inclination of the image sensing unit 300 mounted on the movable frame 11 can be reduced. The magnetic yoke for the image stabilization mechanism 12 can prevent the movable frame 11, the image stabilization mechanism base 19 and the supporting parts 15 from falling off while keeping moving toward the center, and can also effectively utilize the magnetic leakage of the coil for the image stabilization mechanism 14 as a driving force, so that the number of parts can be greatly reduced.

In some embodiments of the present invention, a stop structure may also be arranged between the movable frame 11 and the image stabilization mechanism base 19 on which the movable frame 11 is mounted. That is, the first direction is parallel to the optical axis, the moving part 60 can be the movable frame 11, the fixed component 50 comprises the image stabilization mechanism base 19, the movable frame 11 is movably arranged on the image stabilization mechanism base 19, the movable frame 11 is provided with the accommodating cavity 70, and the image stabilization mechanism base 19 is provided with the protrusion 80; alternatively, the first direction is perpendicular to the optical axis, the moving part 60 can be the movable frame 11, the fixed component 50 comprises the image stabilization mechanism base 19, the movable frame 11 is movably arranged on the image stabilization mechanism base 19, the image stabilization mechanism base 19 is provided with the accommodating cavity 70, and the movable frame 11 is provided with the protrusion 80.

Figure 7:
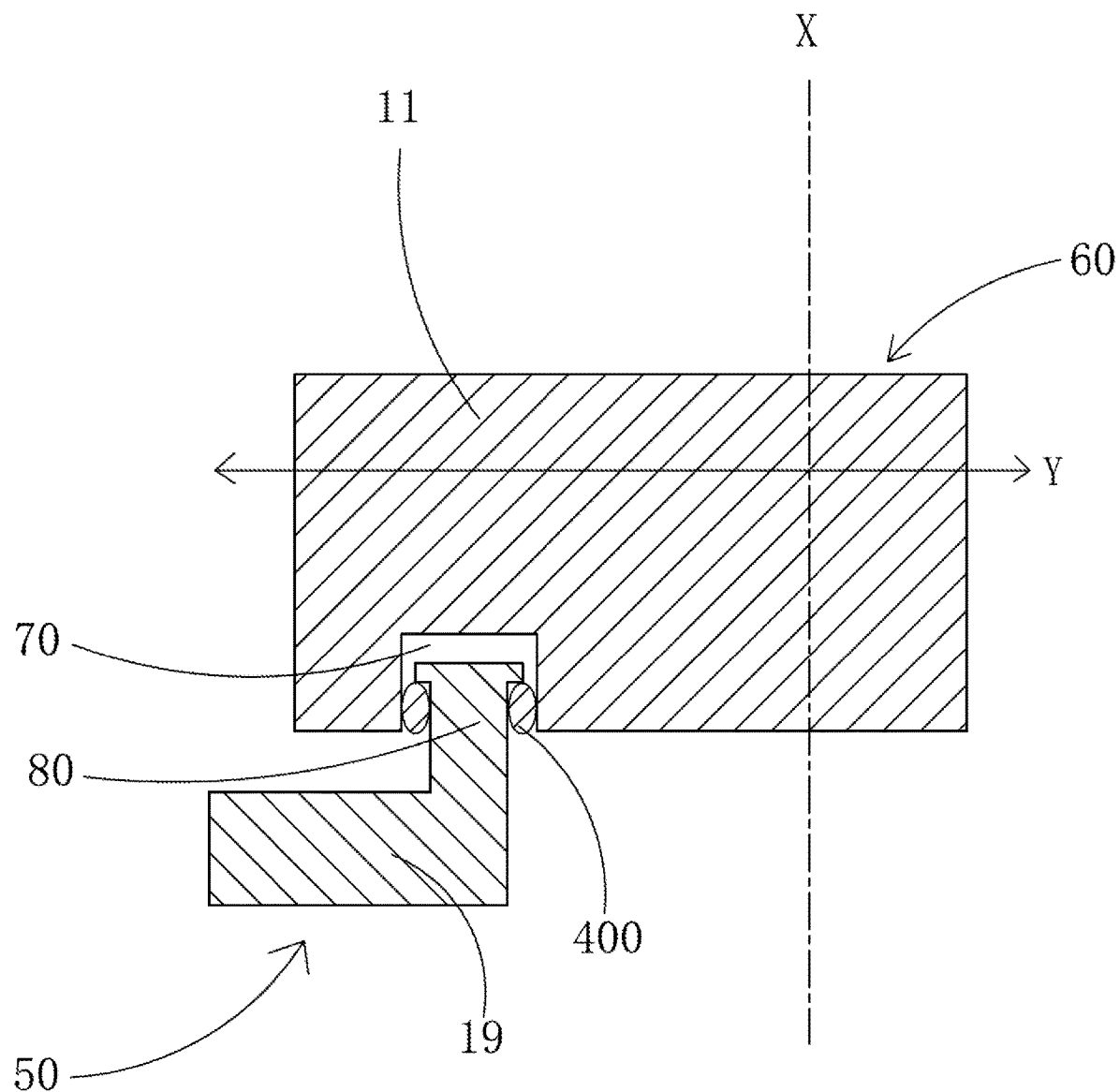
FIG. 7 is a diagram of a stop structure between a movable frame and a fixed component in a lens module provided by some embodiments of the present invention.

As shown in FIG. 7, the image stabilization mechanism base 19 may be provided with the protrusion 80, and the movable frame 11 may be provided with the accommodating cavity 70. When the movable frame 11 drives the image sensing unit 300 to move (in the image stabilization direction indicated by the double-headed arrow Y as shown in FIG. 7) in the plane perpendicular to the optical axis (as shown by the center line X in FIG. 7) to realize image stabilization, the protrusion 80 on the image stabilization mechanism base 19 will move in the accommodating cavity 70 on the movable frame 11. When the second side face 82 of the protrusion 80 on the image stabilization mechanism base 19 contacts the first side face 73 of the accommodating cavity 70 on the movable frame 11, the movable frame 11 will stop moving.

Figure 8:
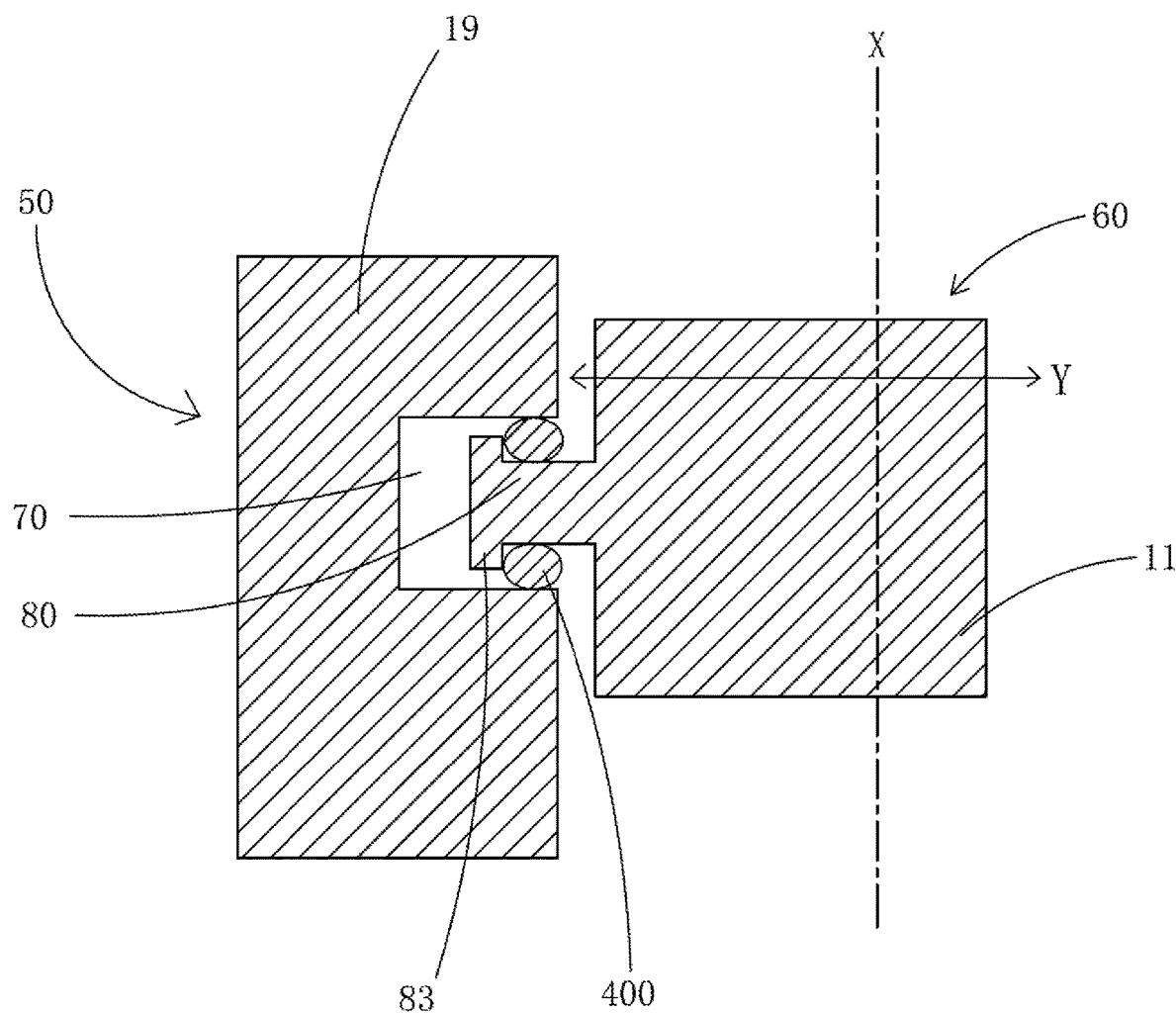
FIG. 8 is a diagram of another stop structure between a movable frame and a fixed component in a lens module provided by some embodiments of the present invention.

As shown in FIG. 8, the accommodating cavity 70 may be disposed on the image stabilization mechanism base 19, and the protrusion 80 may be disposed on the movable frame 11. When the movable frame 11 drives the image sensing unit 300 to move (in the image stabilization direction indicated by the double-headed arrow Y as shown in FIG. 8) in the plane perpendicular to the optical axis (as shown by the center line X in FIG. 8) to realize image stabilization, the protrusion 80 on the movable frame 11 will move in the accommodating cavity 70 on the image stabilization mechanism base 19. When the second side face 82 of the protrusion 80 on the movable frame 11 contacts with the first side face 73 of the accommodating cavity 70 on the image stabilization mechanism base 19, the movable frame 11 will stop moving.

Further, a shock-absorbing gel 18 applied between the image stabilization mechanism base 19 and the housing for the image stabilization mechanism 20 as shown in FIG. 1 can control the fluctuations generated when the image stabilization mechanism 10 is suddenly electrified, so that the image stabilization mechanism 10 has a more accurate image stabilization function.

In some embodiments of the present invention, the first direction is perpendicular to the optical axis, the moving part 60 is the lens holder 35, the fixed component 50 has an inner wall 51 facing the optical axis, the accommodating cavity 70 is arranged on the inner wall 51 of the fixed component 50, and the protrusion 80 is arranged on the lens holder 35.

Figure 9:
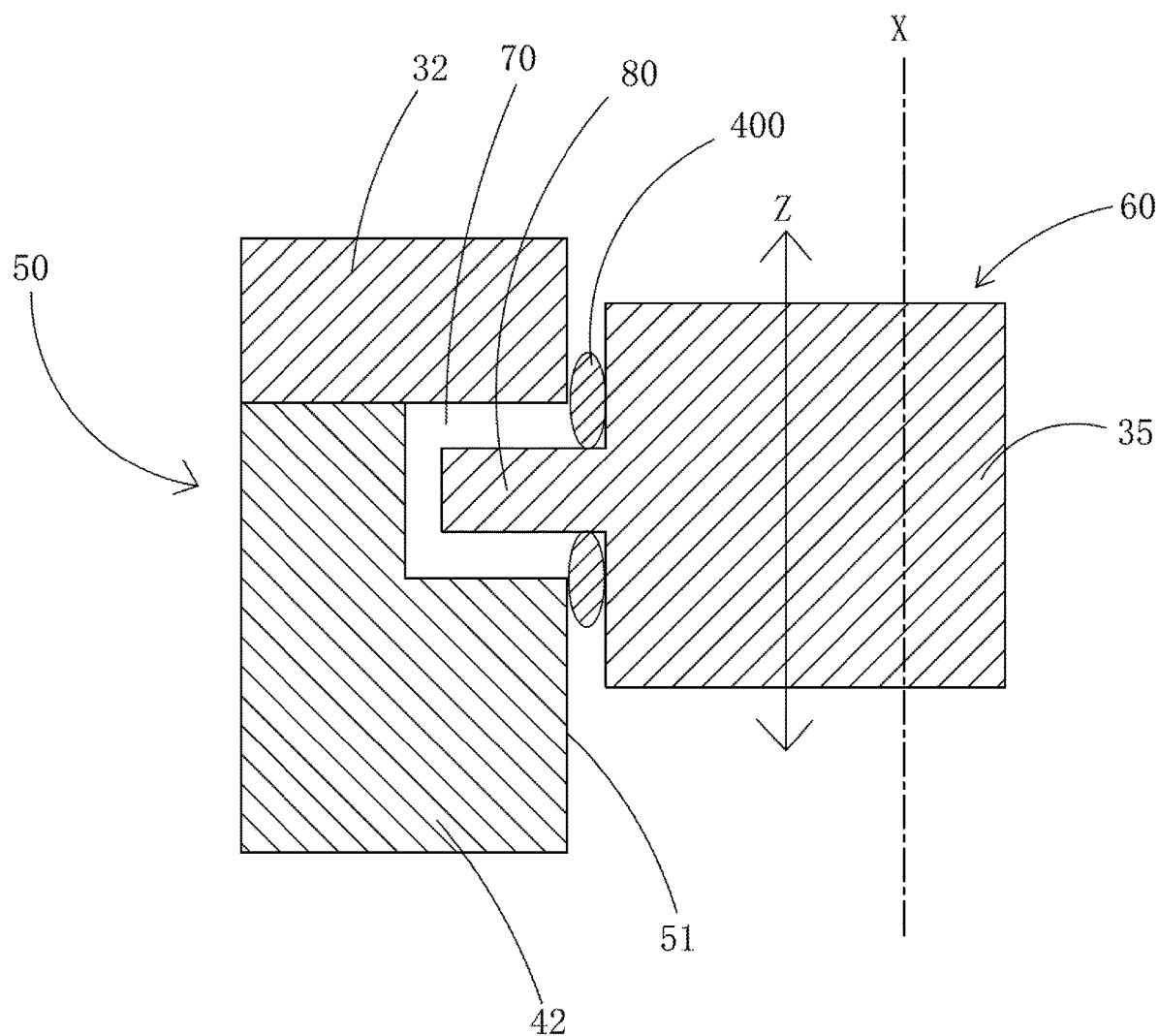
FIG. 9 is a diagram of a stop structure between a lens holder and a fixed component in a lens module provided by some embodiments of the present invention.

As shown in FIG. 9, the fixed component 50 may comprise an automatic focus base 42 and a magnet holding frame for automatic focus 32 fixed to the automatic focus base 42 which are arranged in sequence in the direction of the optical axis. The automatic focus base 42 comprises a contact face that abuts against the magnet holding frame for automatic focus 32, and a step part that is recessed from the contact face in a direction away from the magnet holding frame for automatic focus 32. The magnet holding frame for automatic focus 32 covers the contact face and together with the step part forms the accommodating cavity 70 with the opening 71 facing the optical axis.

The lens holder 35 is connected to the magnet holding frame for automatic focus 32 via an upper leaf spring for automatic focus 34 and to the automatic focus base 42 via a lower leaf spring for automatic focus 37. In this way, the lens holder 35 can be kept suspended under the elasticity of the upper leaf spring for automatic focus 34 and the lower leaf spring for automatic focus 37. The focusing drive mechanism 90 comprises a drive coil for automatic focus 36 fixed to the lens holder 35 and a drive magnet for automatic focus 33 fixed to the magnet holding frame for automatic focus 32. When the drive coil for automatic focus 36 fixed to the lens holder 35 is electrified, the lens holder 35 and the lens 200 can be driven to move in the direction of the optical axis by a magnetic field generated by the drive magnet for automatic focus 33 fixed to the magnet holding frame for automatic focus 32.

As shown in FIG. 9, the dust absorption gel 400 can be arranged around a root of the protrusion 80 arranged on the lens holder 35, and the dust absorption gel 400 can seal the opening 71 of the accommodating cavity 70. When the lens holder 35 moves for focusing in the direction of the optical axis (shown by the center line X in FIG. 9), that is, in the focusing direction shown by the double-headed arrow Z in FIG. 9, the protrusion 80 on the lens holder 35 will collide with the automatic focus base 42 or the magnet holding frame for automatic focus 32, and foreign matter generated will be located in the accommodating cavity 70 and can adhere to the dust absorption gel 400, instead of adhering to the photosensitive surface of the image sensing unit 300 along the gaps between components of the lens module.

There may be four drive magnets for automatic focus 33, the lens holder 35 is provided with four through holes extending in the direction parallel to the optical axis, and the drive magnets for automatic focus 33 are accommodated in the through holes of the lens holder 35. Further, the lens holder 35, the drive coil for automatic focus 36, and the lens 200 are all accommodated in an accommodating space formed by the automatic focus base 42 and the housing for automatic focus 31. The drive coil for automatic focus 36 is controlled by an FPC39 for automatic focus, which is fixed to the magnet holding frame for automatic focus 32 and at least partially extends out of the automatic focus base 42. A Hall element for automatic focus 40 is mounted on the FPC39 for automatic focus to detect the magnetic flux of a position detection magnet for automatic focus 41, so that the position of the lens holder 35 can be fed back to allow the lens module to realize automatic focus accurately.

The lens module may further comprise a magnetic yoke for automatic focus 38 arranged on the automatic focus base 42, and the upper and lower ends of the drive magnet for automatic focus 33 respectively abut against the magnet holding frame for automatic focus 32 and the magnetic yoke for automatic focus 38 in the direction parallel to the optical axis.

During automatic focus, the dust absorption gel 400 arranged on the protrusion 80 of the lens holder 35 can also play a damping role. When the drive coil for automatic focus 36 is suddenly electrified to cause abrupt movements, the dust absorption gel 400 can play a role of buffering and absorbing energy.

In some embodiments of the present invention, stop structures may be provided between the automatic focus base 42 and the lens holder 35, and between the magnet holding frame for automatic focus 32 and the lens holder 35. In this case, the first direction is parallel to the optical axis, the moving part 50 is the lens holder 35, and the fixed component 60 comprises the magnet holding frame for automatic focus 32 and the automatic focus base 42 fixed to the magnet holding frame for automatic focus 32 which are arranged in sequence in the direction of the optical axis; and the accommodating cavity 70 is arranged on the lens holder 35, and the protrusion 80 is arranged on the automatic focus base 42 and the magnet holding frame for automatic focus 32.

The protrusion 80 on the automatic focus base 42 is inserted into the accommodating cavity 70 on an image side face of the lens holder 35, and the protrusion 80 on the magnet holding frame for automatic focus 32 is inserted into the accommodating cavity 70 on an object side face of the lens holder 35.

Figure 10:
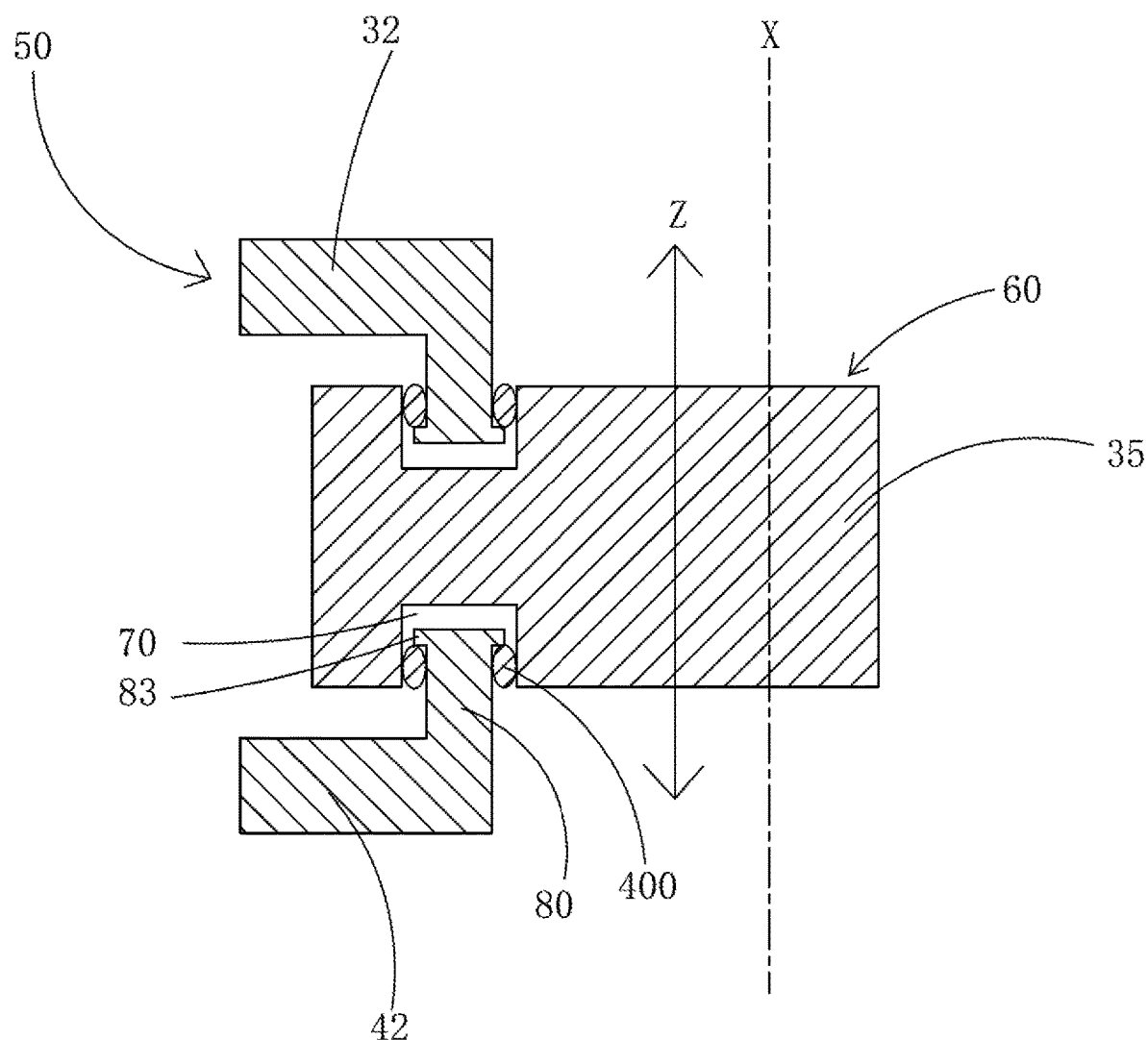
FIG. 10 is a diagram of another stop structure between a lens holder and a fixed component in a lens module provided by some embodiments of the present invention.

As shown in FIG. 10, the dust absorption gel 400 can be arranged around the protrusion 80 on the automatic focus base 42 and the protrusion 80 on the magnet holding frame for automatic focus 32, and the dust absorption gel 400 can seal the openings 71 of the accommodating cavities 70 on the object side face and the image side face of the lens holder 35. When the lens holder 35 moves for focusing in the direction of the optical axis (shown by the center line X in FIG. 10), that is, in the focusing direction shown by the double-headed arrow Z, the second side faces 82 of the protrusion 80 on the automatic focus base 42 and the protrusion 80 on the magnet holding frame for automatic focus 32 will collide with the first side face 73 of the accommodating cavity 70 on the lens holder 35, and foreign matter generated is located in the accommodating cavity 70 and can adhere to the dust absorption gel 400, instead of adhering to the photosensitive surface of the image sensing unit 300 along the gaps between components of the lens module.

In some embodiments of the present invention, as shown in FIGS. 8 and 10, an end, close to the first surface 72 of the accommodating cavity 70, of the protrusion 80 is provided with an anti-falling part 83 extending in a direction towards the first side face 73 of the accommodating cavity 70.

The anti-falling part 83 is arranged around the protrusion 80, and the dust absorption gel 400 is arranged around the protrusion 80 and abuts against the anti-falling part 83.

The position of the dust absorption gel 400 can be fixed by the anti-falling part 83, so that the dust absorption gel 400 can be easily applied to the protrusion 80. Further, due to the existence of the anti-falling part 83, the dust absorption gel 400 can be prevented from separating from an end of the protrusion 80.

Figure 11:
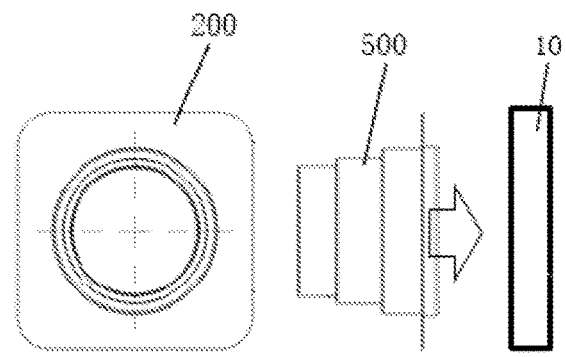
FIG. 11 is a structural diagram of a lens module with a focus adjustment mechanism provided by some embodiments of the present invention.
Figure 12:
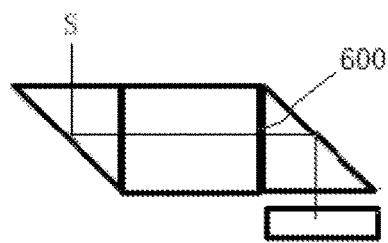
FIG. 12 is a structural diagram of a bending optical system provided by some embodiments of the present invention.

Further, an apparatus for driving the lens 200 can be a retractable zoom mechanism with a focus adjustment mechanism 500 (as shown in FIG. 11, where 10 denotes the image stabilization mechanism), or a tilt shaking correction mechanism which prevents shaking by tilting the lens, or a variable or fixed zoom lens mechanism 600 with a bending focus adjustment mechanism (as shown in FIG. 12, where the light path is shown as a line segment S).

Some embodiments of the present invention also provide a camera comprising the lens module provided by the above embodiments.

By allowing the foreign matter to adhere to the dust absorption gel 400, a good photographing effect of the camera can be ensured.

Figure 13:
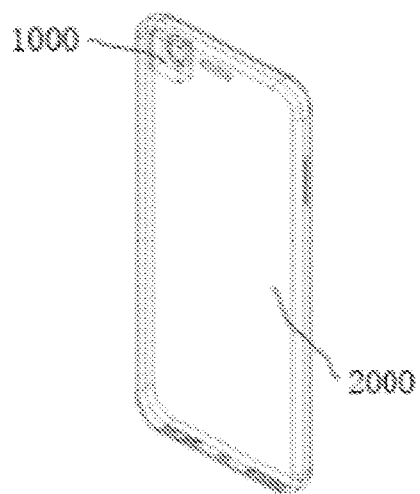
FIG. 13 is a structural diagram of a portable electronic device provided by some embodiments of the present invention.

As shown in FIG. 13, some embodiments of the present invention also provide a portable electronic device 2000, which comprises the camera 1000 provided by the above embodiments. The portable electronic device can be an electronic product with an image pickup function, such as a mobile phone, a tablet computer or a notebook computer.

Those of ordinary skill in the art can understand that the above-mentioned embodiments are specific embodiments for realizing the present invention, but in practical application, various changes can be made in form and detail without departing from the spirit and scope of the present invention.

What is claimed is:

1. A lens module for use in a camera, comprising:
   a fixed component;
   a moving part movably arranged on the fixed component and comprising a lens holder for fixing a lens and driving the lens to move in the direction of an optical axis to realize focusing, and a movable frame for fixing an image sensing unit and driving the image sensing unit to move to realize image stabilization;
   a focusing drive mechanism for driving the lens holder to move relative to the fixed component, and/or an image stabilization drive mechanism for driving the movable frame to move relative to the fixed component;
   wherein one of the fixed component and the moving part is provided with an accommodating cavity with an opening, the other is provided with a protrusion, which is inserted into the accommodating cavity from the opening in a first direction and is able to move in the accommodating cavity, the accommodating cavity has a first surface spaced apart from the protrusion in the first direction and a first side face extending from a periphery of the first surface in the first direction, and the protrusion has a second surface spaced apart from the first surface and a second side face extending from the second surface in the first direction; and
   a dust absorption gel arranged on the first surface and sealing a gap between the first surface and the second surface, or arranged on the second side face and sealing a gap between the first side face and the second side face.

2. The lens module according to claim 1, wherein the first direction is parallel to the optical axis, the moving part is a movable frame, the fixed component comprises an automatic focus base and an image stabilization mechanism base fixed to the automatic focus base which are arranged in sequence in the direction of the optical axis, and the movable frame is movably arranged on the image stabilization mechanism base; and the accommodating cavity is arranged on the movable frame and has the opening facing the automatic focus base, and the protrusion is arranged on the automatic focus base.

3. The lens module according to claim 2, wherein the dust absorption gel is arranged on the first surface and seals the gap between the first surface and the second surface.

4. The lens module according to claim 3, wherein the accommodating cavity comprises a limiting part extending from the first surface in a direction towards the automatic focus base and spaced apart from the first side face, the protrusion is of an annular structure surrounding the limiting part, and the dust absorption gel is of an annular structure surrounding the limiting part.

5. The lens module according to claim 3, wherein the movable frame is quadrangular, and four accommodating cavities are arranged on four sides of the movable frame respectively.

6. The lens module according to claim 2, wherein the dust absorption gel is arranged on the second side face and seals the gap between the first side face and the second side face.

7. The lens module according to claim 2, wherein the image stabilization drive mechanism comprises a coil for the image stabilization mechanism arranged on the movable frame and a magnet for the image stabilization mechanism arranged on the image stabilization mechanism base.

8. The lens module according to claim 1, wherein the first direction is parallel to the optical axis, the moving part is a movable frame, the fixed component comprises an image stabilization mechanism base, and the movable frame is movably arranged on the image stabilization mechanism base; and the movable frame is provided with the accommodating cavity, and the image stabilization mechanism base is provided with the protrusion.

9. The lens module according to claim 1, wherein the first direction is perpendicular to the optical axis, the moving part is a movable frame, the fixed component comprises an image stabilization mechanism base, and the movable frame is movably arranged on the image stabilization mechanism base; and the image stabilization mechanism base is provided with the accommodating cavity, and the movable frame is provided with the protrusion.

10. The lens module according to claim 1, wherein the first direction is perpendicular to the optical axis, the moving part is a lens holder, the fixed component has an inner wall facing the optical axis, the accommodating cavity is arranged on the inner wall, and the protrusion is arranged on the lens holder.

11. The lens module according to claim 1, wherein the first direction is parallel to the optical axis, the moving part is a lens holder, and the fixed component comprises a magnet holding frame for automatic focus and an automatic focus base fixed to the magnet holding frame for automatic focus which are arranged in sequence in the direction of the optical axis; and the accommodating cavity is arranged on the lens holder, and the protrusion is arranged on the automatic focus base and the magnet holding frame for automatic focus.

12. The lens module according to claim 1, wherein an end, close to the first surface, of the protrusion is provided with an anti-falling part extending in a direction towards the first side face.

13. A portable electronic device, comprising the camera according to claim 1.

\* \* \* \* \*